US012033770B2

(12) United States Patent
Aramaki et al.

(10) Patent No.: US 12,033,770 B2
(45) Date of Patent: Jul. 9, 2024

(54) ARRANGEMENT STRUCTURE OF WIRING MEMBER, AND WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Yasuo Omori, Mie (JP); Housei Mizuno, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/773,284

(22) PCT Filed: Nov. 4, 2020

(86) PCT No.: PCT/JP2020/041196
§ 371 (c)(1),
(2) Date: Apr. 29, 2022

(87) PCT Pub. No.: WO2021/100464
PCT Pub. Date: May 27, 2021

(65) Prior Publication Data
US 2023/0052711 A1 Feb. 16, 2023

(30) Foreign Application Priority Data
Nov. 20, 2019 (JP) ................................ 2019-209713

(51) Int. Cl.
*H01B 7/00* (2006.01)
*G02B 6/36* (2006.01)
(Continued)

(52) U.S. Cl.
CPC ......... *H01B 7/0846* (2013.01); *G02B 6/3608* (2013.01); *H01B 7/0823* (2013.01);
(Continued)

(58) Field of Classification Search
CPC .. H01B 7/0846; H01B 7/0823; H01B 7/0838; G02B 6/3608; B60R 16/0207; H02G 3/30
See application file for complete search history.

(56) References Cited

U.S. PATENT DOCUMENTS

2003/0217864 A1\* 11/2003 Ishikawa .............. H01B 7/0045
174/135
2006/0213344 A1 9/2006 Yamamoto
(Continued)

FOREIGN PATENT DOCUMENTS

| CN | 1490827 | 4/2004 |
| CN | 1838339 | 9/2006 |

(Continued)

OTHER PUBLICATIONS

JP 2-17879 English Translation; published in 1990 (Year: 1990).\*
(Continued)

*Primary Examiner* — Pete T Lee
(74) *Attorney, Agent, or Firm* — GREENBLUM & BERNSTEIN, P.L.C.

(57) ABSTRACT

An arrangement structure of a wiring member includes: a wiring member including a plurality of wire-like transmission members parallelly arranged and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members.

7 Claims, 5 Drawing Sheets

(51) Int. Cl.
*H01B 7/08* (2006.01)
*B60R 16/02* (2006.01)
*H02G 3/30* (2006.01)

(52) U.S. Cl.
CPC ........ *H01B 7/0838* (2013.01); *B60R 16/0207* (2013.01); *H02G 3/30* (2013.01)

(56) References Cited

U.S. PATENT DOCUMENTS

| | | | |
|---|---|---|---|
| 2012/0267145 | A1 | 10/2012 | Huang et al. |
| 2016/0236631 | A1* | 8/2016 | Kamijo ............ H01B 13/01263 |
| 2019/0385764 | A1* | 12/2019 | Hayakawa .......... B60R 16/0207 |
| 2019/0392963 | A1 | 12/2019 | Ishida et al. |

FOREIGN PATENT DOCUMENTS

| | | |
|---|---|---|
| CN | 201408602 | 2/2010 |
| CN | 102751015 | 10/2012 |
| CN | 205722888 | 11/2016 |
| CN | 207020998 | 2/2018 |
| CN | 110313039 | 10/2019 |
| EP | 106518 | 4/1984 |
| JP | 59-007514 U | 1/1984 |
| JP | 59-075505 | 4/1984 |
| JP | 59-224012 | 12/1984 |
| JP | 4-6125 U | 1/1992 |
| JP | 6-77116 U | 10/1994 |
| JP | 8-96628 | 4/1996 |
| JP | 8-315641 | 11/1996 |
| JP | 10-3822 | 1/1998 |
| JP | 2007-213949 | 8/2007 |
| JP | 2018-137208 | 8/2018 |

OTHER PUBLICATIONS

JPS 59-224012A hereinafter Takao (Year: 1984).*
JPS 59-224012A (Year: 1984).*
JP 10217875 A1 English Translation; published in 199 (Year: 1998).*
International Search Report issued in International Patent Application No. PCT/JP2020/041196, dated Dec. 8, 2020, along with an English translation thereof.
International Preliminary Report on Patentability issued in International Patent Application No. PCT/JP2020/041196, dated Jul. 9, 2021, along with an English translation thereof.
Japan Office Action issued in Japan Patent Application No. 2019-209713, dated Oct. 18, 2022, together with English translation thereof.
China Office Action issued in China Patent Application No. 202080078929.X, dated Jun. 26, 2023, together with English translation thereof.
Japan Office Action issued in Japan Patent Application No. 2019-209713, dated Jun. 6, 2023, together with English translation thereof.

* cited by examiner

ARRANGEMENT STRUCTURE OF WIRING MEMBER, AND WIRING MEMBER

TECHNICAL FIELD

The present disclosure relates to an arrangement structure of a wiring member and the wiring member.

BACKGROUND ART

Patent Document 1 discloses a wire harness in which an electrical wire is welded to a functional exterior member formed into a sheet-like shape.

PRIOR ART DOCUMENTS

Patent Document 1: Japanese Patent Application Laid-Open No. 2018-137208

SUMMARY

Problem to be Solved by the Invention

There is a case where a wiring member flatly formed as with a wire harness in Patent Document 1 is disposed in a space having a bended portion in a vehicle.

Therefore, an object is to provide a technique of easily arranging a wiring member in a spade having a bended portion in a vehicle.

Means to Solve the Problem

An arrangement structure of a wiring member according to the present disclosure includes: a wiring member including a plurality of wire-like transmission members parallelly arranged and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members.

Effects of the Invention

According to the present disclosure, the wiring member can be easily disposed in a space having a bended portion in a vehicle.

DESCRIPTION OF EMBODIMENT(S)

Description of Embodiment of Present Disclosure

Figure 1:
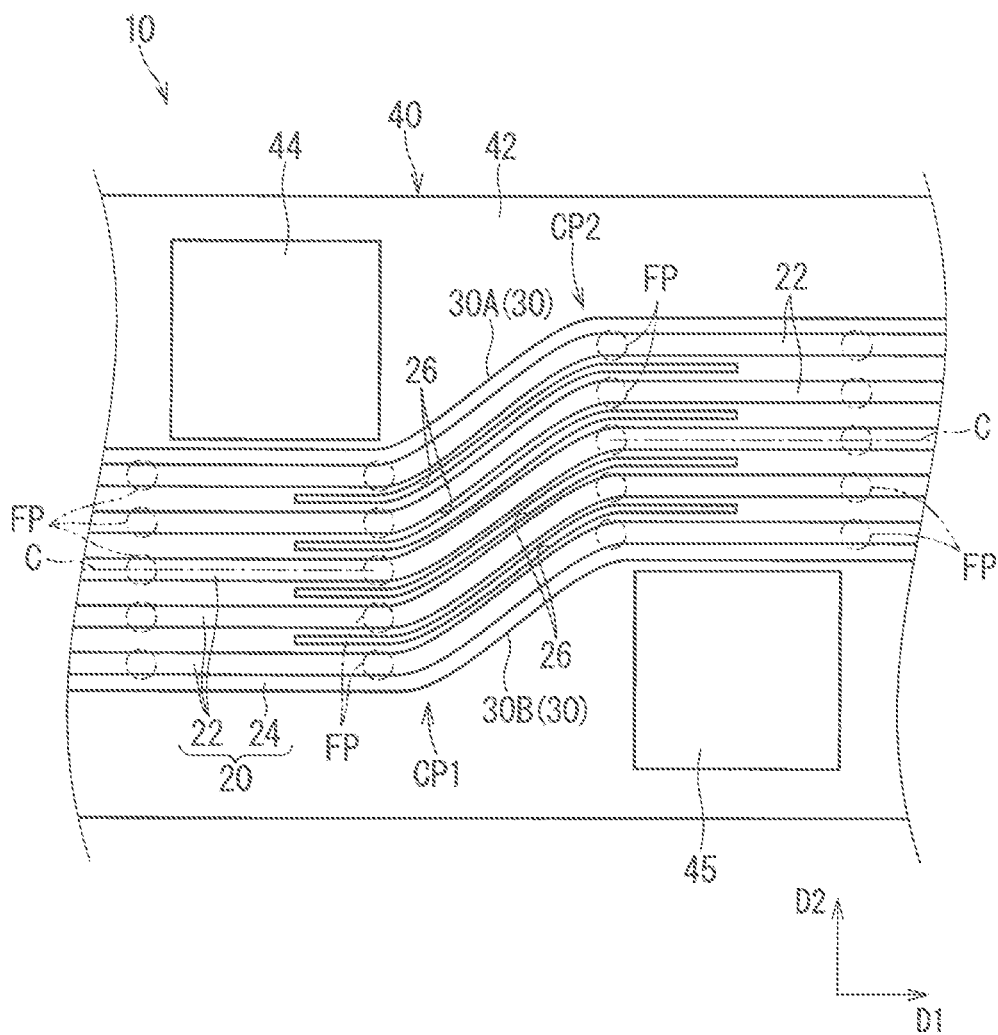
FIG. 1 is a plan view illustrating an arrangement structure of a wiring member according to an embodiment 1.

Embodiments of the present disclosure are listed and described firstly.

An arrangement structure of a wiring member according to the present disclosure is as follows.

(1) An arrangement structure of a wiring member includes a wiring member including a plurality of wire-like transmission members parallelly arranged and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members. The slit extending along the longitudinal direction of the plurality of wire-like transmission members is formed in the portion of the base between the plurality of wire-like transmission members, thus the wiring member is easily headed at a position of the slit. The wiring member can be easily disposed in a space having a bended portion in a vehicle.

(2) It is also applicable that the base includes a sheet, and the plurality of wire-like transmission members are fixed to a main surface of the sheet. Accordingly, the wiring member can be easily formed using a general wire.

(3) It is also applicable that each of the plurality of wire-like transmission members is fixed at a plurality of positions in the sheet at intervals along the longitudinal direction, and at least one fixing position where each of the plurality of wire-like transmission members and the sheet are fixed to each other is provided in a lateral position of the slit. Accordingly, suppressed is that the wire-like transmission member leaves the sheet when the wiring member is bended at the position of the slit.

(4) It is also applicable that a first slit is formed as the slit between a first pair of wire-like transmission members in the plurality of wire-like transmission members, a second slit is formed as the slit between a second pair of wire-like transmission members in the plurality of wire-like transmission members, and the first and the second slit are formed in different positions along the longitudinal direction. Accordingly, reduction in strength of the sheet can be suppressed while the wiring member is easily bended.

(5) The wiring member may be disposed on the arrangement target while being bended at a position of the slit. Accordingly, the wiring member is bonded and disposed.

(6) Centers of the wiring member in a width direction may mutually deviate in the width direction in portions on both sides of a bended portion in the wiring member. Accordingly, the wiring member can be eccentrically disposed.

(7) It is also applicable that the wiring member is bended at a portion where the wiring member extends over a level difference, and the level difference includes a portion having different heights along a parallel direction of the plurality of wire-like transmission members. Accordingly, the wiring member can be disposed to extend over the level difference including the portion having the different heights.

(8) A wiring member according to the present disclosure includes: a plurality of wire-like transmission members parallelly arranged; and a sheet having a main surface to which the plurality of wire-like transmission members are fixed, wherein a slit extending along a longitudinal direction of the plurality of wire-like transmission members is formed in a portion of the sheet between the plurality of wire-like transmission members. The slit extending along the longitudinal direction of the plurality of wire-like transmission members is formed in the portion of the sheet between the plurality of wire-like transmission members, thus the wiring member is easily bended at the position of the slit. The wiring member can be easily disposed in a space having a bended portion in a vehicle.

Details of Embodiment of Present Disclosure

Specific examples of an arrangement structure of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

Figure 2:
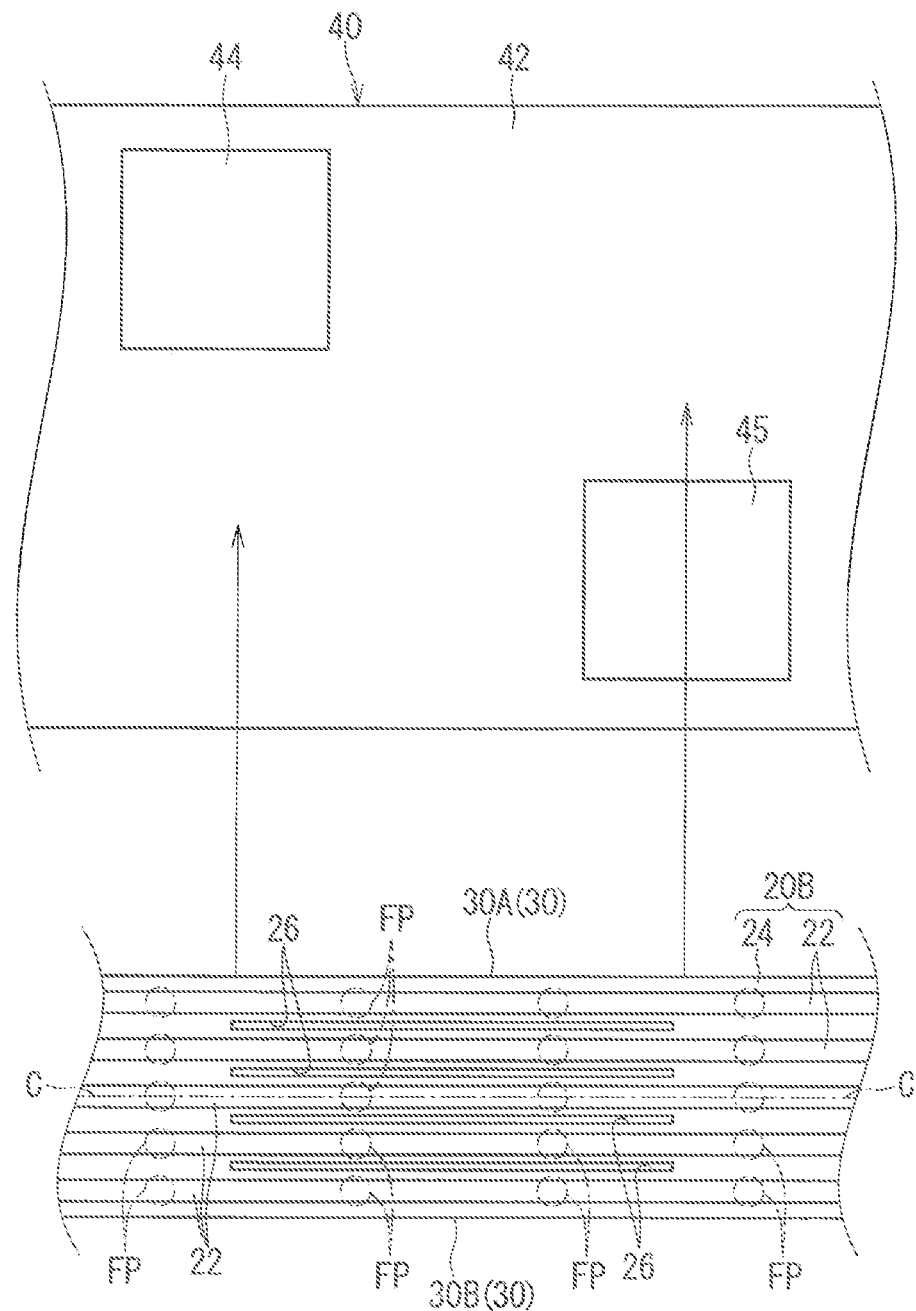
FIG. 2 is an explanation diagram illustrating the wiring member disposed on an arrangement target.

An arrangement structure of a wiring member according to an embodiment 1 is described hereinafter. FIG. 1 is a plan view illustrating an arrangement structure 10 of a wiring member according to the embodiment 1. FIG. 2 is an explanation diagram illustrating a wiring member 20B disposed on an arrangement target 40. In the present specification, when the wiring member 20 before being bended and the wiring member 20 after being bended need to be distinguished, a code B is added to the wiring member 20 before being bended so as to be expressed as the wiring member 20B for distinction.

The arrangement structure 10 of the wiring member includes the wiring member 20 and the arrangement target 40. The wiring member 20 is disposed on the arrangement target 40 while at least a part of the wiring member 20 is bended.

The wiring member 20 includes a plurality of wire-like transmission members 22 and a base 24. The plurality of wire-like transmission members 22 are wire-like members transmitting an electrical power or light, for example. The base 24 is formed into a flat shape as a whole. The plurality of wire-like transmission members 22 are fixed to the base 24, thus the wiring member 20 is kept in a flat state.

The plurality of wire-like transmission members 22 are assumed to be members connecting components in a vehicle. A connector, for example is provided on an end portion of the wire-like transmission member 22. This connector is connected to a connector provided in the other side component, thus the wire-like transmission member 22 is connected to the other side component. That is to say, the present wiring member 20 is used as the wiring member 20 electrically connecting various types of component in a vehicle, for example (or connecting them so that they can perform optical communication). The connector may be fixed to the base 24.

A route of the plurality of wire-like transmission members 22 is set in accordance with a position of a component to which the wire-like transmission members 22 are connected. The plurality of wire-like transmission members 22 are fixed to the base 24, thus the plurality of wire-like transmission members 22 are kept in a form following a wiring route corresponding to a position of a component as a connection destination of each wire-like transmission member 22. The plurality of wire-like transmission members 22 may be fixed to the base 24 in a state where a branch wire part is branched from a main wire part. A portion where the plurality of wire-like transmission members 22 are parallelly arranged may be provided in the wiring member 20.

The wire-like transmission member 22 may be a wire-like member transmitting an electrical power or light, for example, as described above. For example, the wire-like transmission member 22 may be a general wire having a core wire and a covering around the core wire, or may also be a bare wire, a shielded wire, a twisted wire, an enamel wire, a nichrome wire, or an optical fiber.

The wire-like transmission member 22 transmitting the electrical power may be various kinds of signal lines or various kinds of power lines. Some of the wire-like transmission members 22 transmitting the electrical power may be used as an antenna or coil, for example, transmitting or receiving a signal or electrical power to or from a space.

The wire-like transmission member 22 may be a single wire-like object or a composite object of a plurality of wire-like objects (a twisted wire and a cable made up of a plurality of wire-like objects covered by a sheath).

Description herein is based on an assumption that the wire-like transmission member 22 is an electrical wire.

The base 24 keeps the plurality of wire-like transmission members 22 in a state of being arranged side by side. A slit 26 is formed in the base 24. The slit 26 extends along a longitudinal direction of the plurality of wire-like transmission members 22. The slit 26 is formed in a portion of the base 24 between the plurality of wire-like transmission members 22. The wiring member 20 is disposed on the arrangement target 40 while the wiring member 20 is bended at a position of the slit 26.

When three or more wire-like transmission members 22 are parallelly provided, there are a plurality of portions between the wire-like transmission members 22. Specifically, five wire-like transmission members are parallelly arranged in FIG. 1. Thus, there are four portions between the wire-like transmission members 22. In this case, the slit 26 may be formed in all or only some of the portions between the plurality of wire-like transmission members 22. The slit 26 may be formed in at least one of the portions between the plurality of wire-like transmission members 22. An interval between the wire-like transmission members 22 in a portion where the slit 26 is not formed in the portions between the plurality of wire-like transmission members 22 may be larger or smaller than an interval between the wire-like transmission members 22 in the portion where the slit 26 is formed, or they may also be the same as each other.

The slit 26 is used for bending the wiring member 20 to have a shape corresponding to a route of the wiring member 20. Thus, the slit 26 may be formed so that the wiring member 20 can be bended into a shape corresponding to the route of the wiring member 20. Herein, the route of the wiring member 20 is a route in which a difference occurs in lengths of the routes of the plurality of wire-like transmission members 22 at a bended portion when the wiring member 20 with no slit 26 is bended. Thus, the slit 26 may be formed to be able to reduce or absorb a difference in length of the routes when the wiring member 20 is bended.

The slit 26 may have a width. That is to say, a portion of the slit 26 in the sheet 24 may be formed into a notched shape. The slit 26 may not have a width. That is to say, a portion of the slit 26 in the sheet 24 may be formed to have a cut line.

Herein, the base 24 is the sheet 24. The base 24 may include a member other than the sheet 24. The plurality of wire-like transmission members 22 are fixed to a main surface of the sheet 24. The sheet 24 may be a resin sheet. For example, the sheet 24 may be formed of resin such as polyvinyl chloride (PVC), polyethylene (PE), polypropylene (PP), or polyethylene terephthalate (PET). The sheet 24 is also considered a non-woven cloth or a foamed sheet, for example. The sheet 24 may have a single layer structure, or may also have a multilayer structure. The sheet 24 may include a metal layer.

A fixing structure of the wire-like transmission member 22 fixed to the base 24 is not particularly limited as long as the wire-like transmission member 22 is fixed to the base 24.

For example, the wire-like transmission member 22 is fixed to the sheet 24. Applicable as the fixing state are a contact area fixation and a non-contact area fixation, or both fixations may be used together. Herein, the contact area fixation indicates that a portion where the wire-like transmission member 22 and the sheet 24 have contact with each other is stuck and fixed. The non-contact area fixation is a fixing state which is not the contact area fixation, and indicates that a sewing thread, a cover, or an adhesive tape presses the wire-like transmission member 22 toward the sheet 24 or sandwiches the wire-like transmission member 22 and the sheet 24 to keep them in a fixing state. In the description hereinafter, the wire-like transmission member 22 and the sheet 24 are in the state of the contact area fixation.

Applicable as the configuration of the contact area fixation are a contact area indirect fixation and a contact area direct fixation, or both fixations may also be used together in different regions. Herein, the contact area indirect fixation indicates that the wire-like transmission member 22 and the sheet 24 are indirectly stuck and fixed via an adhesive agent, a gluing agent, and a double-sided adhesive tape provided therebetween. The contact area direct fixation indicates that the wire-like transmission member 22 and the sheet 24 are directly stuck and fixed without an intervention of the adhesive agent, for example, which is separately provided. Considered in the contact area direct fixation is that resin included in at least one of the wire-like transmission member 22 and the sheet 24 is melted, thus the wire-like transmission member 22 and the sheet 24 are stuck and fixed, for example.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing, welding, hot air welding, and high frequency welding can be adopted. When the state of the contact area direct fixation is formed by these means, the wire-like transmission member 22 and the sheet 24 are in the state of the contact area direct fixation by these means. Specifically, when the state of the contact area direct fixation is formed by the ultrasonic welding, for example, the wire-like transmission member 22 and the sheet 24 are in the state of the contact area direct fixation by the ultrasonic welding.

In the description hereinafter, the wire-like transmission member 22 and the sheet 24 are in the state of the contact area direct fixation.

Each of the plurality of wire-like transmission members 22 is fixed to the sheet 24 at a plurality of positions at intervals along the longitudinal direction. In FIG. 1 and FIG. 2, fixing positions FP where each of the plurality of wire-like transmission members 22 and the sheet 24 are fixed are indicated by dashed-two dotted lines. Herein, two fixing positions FP where each of the plurality of wire-like transmission members 22 and the sheet 24 are fixed are provided in lateral positions of the slit 26. One fixing position FP where each of the plurality of wire-like transmission members 22 and the sheet 24 are fixed may also be provided in a lateral position of the slit 26, or three or more fixing positions FP may also be provided therein. At least one fixing position FP where each of the plurality of wire-like transmission members 22 and the sheet 24 are fixed is preferably provided in a lateral position of the slit 26.

The plurality of wire-like transmission members 22 are fixed to the sheet 24 at the same position along the longitudinal direction in the wiring member 20B. The plurality of wire-like transmission members 22 may be fixed to the sheet 24 at different positions along the longitudinal direction in the wiring member 20B. Intervals between the plurality of fixing positions FP may be the same or different from each other in one wire-like transmission member 22.

The arrangement target 40 is various types of member in a vehicle. For example, the arrangement target 40 may be an exterior panel, a vehicle body frame, or an interior member. The exterior panel is a member constituting an external appearance of a vehicle such as a door panel or a roof panel, for example. The vehicle body frame is a member constituting a framework of a vehicle. The vehicle body frame includes a reinforcement, for example. The interior member is a member constituting an internal appearance of a vehicle such as an instrument panel, a door trim, or a roof trim, for example. A shape of the arrangement target 40 is formed into a shape corresponding to various types of member. The arrangement target 40 may be formed into a rod-like shape or a plate-like shape, for example.

The arrangement target 40 includes an arrangement surface 42 herein. The wiring member 20 is disposed along the arrangement surface 42. The arrangement surface 42 may be a planar surface or a curved surface. The arrangement surface 42 is provided with obstacles 44 and 45. The obstacles 44 and 45 are concave-shaped portions formed in an exterior panel, a vehicle body frame, and an interior member, for example. The obstacles 44 and 45 are various types of component including an electrical component attached to an exterior panel, a vehicle body frame, and an interior member, for example.

Herein, the wiring member 20 is disposed to go around the obstacles 44 and 45. That is to say, the route of the wiring member 20 is set to go around the obstacles 44 and 45. The wiring member 20 is bended along the arrangement surface 42 in a portion where the wiring member 20 goes around the obstacles 44 and 45.

Centers C of the wiring member 20 in a width direction mutually deviate in portions on both sides of a bended portion in the wiring member 20. A first direction D1 and a second direction D2 are directions along the arrangement surface 42 in the example illustrated in FIG. 1, for example. The first direction D1 and the second direction D2 are perpendicular to each other. The wiring member 20 wholly extends along the first direction D1. The plurality of wire-like transmission members 22 are arranged side by side along the second direction D2 in a portion where the wiring member 20 is not bended. Two obstacles 44 and 45 are provided at an interval along the first direction. The interval between the two obstacles 44 and 45 along the second direction D2 is smaller than a width dimension of the wiring member 20. Thus, the wiring member 20 is bended to displace the center C in the width direction when the wiring member 20 passes close to the two obstacles 44 and 45.

A portion of the wiring member 20 bended near the obstacle 44 is referred to as a bended portion CP1. The wiring member 20 is bended so that one side portion along the second direction D2 is located on an inner peripheral side and the other side portion is located on an outer peripheral side in the bended portion CP1. A portion where the slit 26 is formed is disposed in the headed portion CP1. Accordingly, the wiring member 20 can easily correspond to the bended portion CP1.

In the similar manner, a portion of the wiring member 20 bended near the obstacle 45 is referred to as a bended portion CP2. The wiring member 20 is bended so that one side portion along the second direction D2 is located on an outer peripheral side and the other side portion is located on an inner peripheral side in the banded portion CP2. A portion where the slit 26 is formed is disposed in the bended portion CP2. Accordingly, the wiring member 20 can easily correspond to the bended portion CP2.

The slit 26 in the bended portion CP1 and the slit 26 in the bended portion CP2 are connected in the wiring member 20. That is to say, the continuous slit 26 is formed in a portion ranging from the bended portion CP1 to the headed portion CP2. The slit 26 in the bended portion CP1 and the slit 26 in the bended portion CP2 may not be connected. That is to say, there may be a portion where the slit 26 is not formed between the bended portion CP1 and the banded portion CP2.

A portion divided by the slit 26 is referred to as a divided portion 30 in the wiring member 20. The divided portion 30 includes a sheet portion and the wire-like transmission member 22 fixed to the sheet portion. The sheet portion is a portion where the sheet 24 is divided by the slit 26. In the example illustrated in FIG. 1, live divided portions 30 are provided in the banded portions CP1 and CP2. A difference may occur in lengths of routes in portions corresponding to the five divided portions 30 in each of the bended portions CP1 and CP2. This difference in lengths of the routes is one of causes making it difficult to bend the wiring member. More specifically, when the slit 26 is not formed in the sheet 24, a range where the wiring member 20 can be bended is within a range in which the difference in lengths of the routes is absorbed by shorter one of an extension of the sheet 24 and an extension of the wire-like transmission member 22. That is to say, when the slit 26 is not formed in the sheet 24, the difference in lengths of the routes cannot be absorbed if the bending of the wiring member 20 exceeds a limitation of extension of at least one of the sheet 24 and the wire-like transmission member 22, and a further extension is hardly performed.

In the meanwhile, the slit 26 is formed in the sheet 24 herein, thus the plurality of divided portions 30 can be independently moved. Accordingly, the difference in lengths of the routes can be reduced or absorbed. Accordingly, a range in which the wiring member 20 can be bended increases. More specifically, for example, the difference in lengths of the routes can be reduced by bringing some of the divided portions 30 close to each other or making them overlap with each other in the bended portions CP1 and CP2. For example, the difference in lengths of the routes can be absorbed by bending some of the divided portions 30 in a direction away from the arrangement surface 42 in the bended portions CP1 and CP2.

Specifically, the length of the route of a divided portion 30A on a side closer to the obstacle 44 in the plurality of divided portions 30 is shorter than the length of the route of a divided portion 30B on a side farther away from the obstacle 44 at the bended portion CP1. In this case, the difference in length of the routes is reduced by bringing the divided portion 30A close to the divided portion 30B or bringing the divided portion 30B close to the divided portion 30A. The difference in lengths of the routes can be absorbed by bending the divided portion 30A having a short length of the route in a direction away from the arrangement surface 42.

In contrast, the length of the route of the divided portion 308 on a side closer to the obstacle 45 in the plurality of divided portions 30 is shorter than the length of the route of the divided portion 30A on a side farther away from the obstacle 45 at the bended portion CP2. In this case, the difference in length of the routes is reduced by bringing the divided portion 30B close to the divided portion 30A or bringing the divided portion 30A close to the divided portion 30B. The difference in lengths of the routes can be absorbed bending the divided portion 30B having a short length of the route in a direction away from the arrangement surface 42.

In the example illustrated in FIG. 1, the centers C of the wiring member 20 in the width direction mutually deviate in portions on both sides of the bended portion in the wiring member 20. That is to say, the centers C in the width direction deviate in the second direction D2 and are parallel to each other in a portion on one adjacent side of the bended portion CP1 and the bended portion CP2 in the wiring member 20 (a portion located on a left side of the bended portion CP1 in FIG. 1) and a portion on the other adjacent side of the bended portion CP1 and the bended portion CP2 in the wiring member 20 (a portion located on a right side of the bended portion CP2 in FIG. 1). In this case, the difference in lengths of the routes in the bended portion CP1 and the difference in lengths of the routes in the bended portion CP2 are reversed. Thus, the difference in lengths of the routes is reduced when a range including both the bended portion CP1 and the bended portion CP2 is viewed compared with a case where a range including only one of the bended portion CP1 and the bended portion CP2 is viewed.

Extended lines of the Centers C of the wiring member 20 in the width direction may be bended to cross each other in the portions on both sides of the bended portion in the wiring member 20. For example, the wiring member 20 may be bended to include only one of the bended portion CP1 and the bended portion CP2.

In the example illustrated in FIG. 1, the plurality of divided portions 30 are arranged in line at the bended portions CP1 and CP2 and a portion therebetween, however, this is a schematic description, thus the divided portions 30 need not be necessarily arranged in line.

According to the arrangement structure 10 of the wiring member having the configuration described above, the slit 26 extending along the longitudinal direction of the plurality of wire-like transmission members 22 is formed in the portion of the base 24 between the plurality of wire-like transmission members 22, thus the wiring member 20 is easily bended the position of the slit 26. The wiring member 20 can be easily disposed in a space having a bended portion in a vehicle.

The plurality of wire-like transmission members 22 are fixed to the main surface of the sheet 24, thus the wiring member 20 can be formed using a general wire. Intervals between the plurality of wire-like transmission members 22 can be appropriately set.

At least one fixing positions FP where each of the plurality of wire-like transmission members 22 and the sheet 24 are fixed is provided in the lateral position of the slit 26, thus suppressed is that the wire-like transmission member 22 leaves the sheet 24 when the wiring member 20 is bended at the position of the slit 26.

The centers C of the wiring member 20 in the width direction mutually deviate in the portions on both sides of the bent portion in the wiring member 20, thus the wiring member 20 can be eccentrically disposed.

According to the wiring member 20B having the configuration described above, the slit 26 extending along the longitudinal direction of the plurality of wire-like transmission members 22 is formed in the portion the sheet 24 between the plurality of wire-like transmission members 22, thus the wiring member 20B is easily betided at the position of the slit 26. The wiring member 20B can be easily disposed in a space having a bended portion in a vehicle.

Embodiment 2

Figure 3:
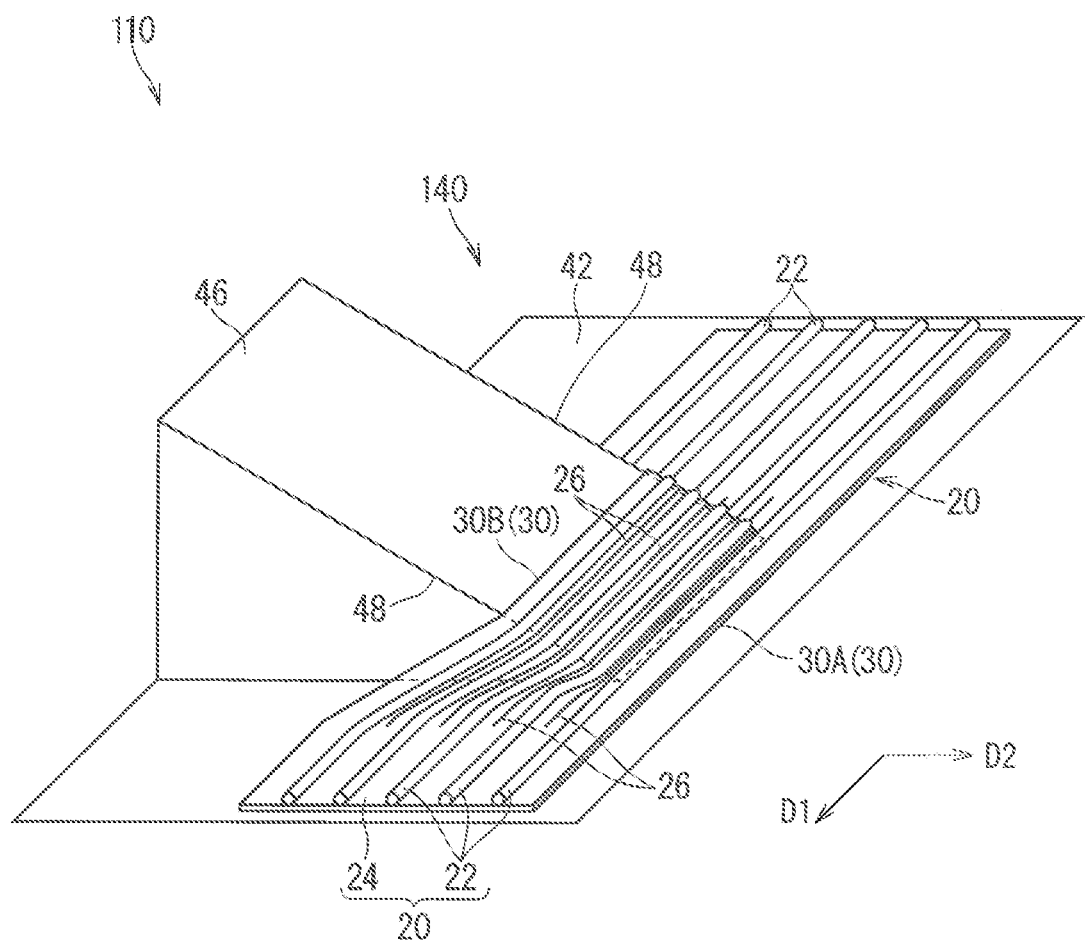
FIG. 3 is a perspective view illustrating an arrangement structure of a wiring member according to an embodiment 2.
Figure 4:
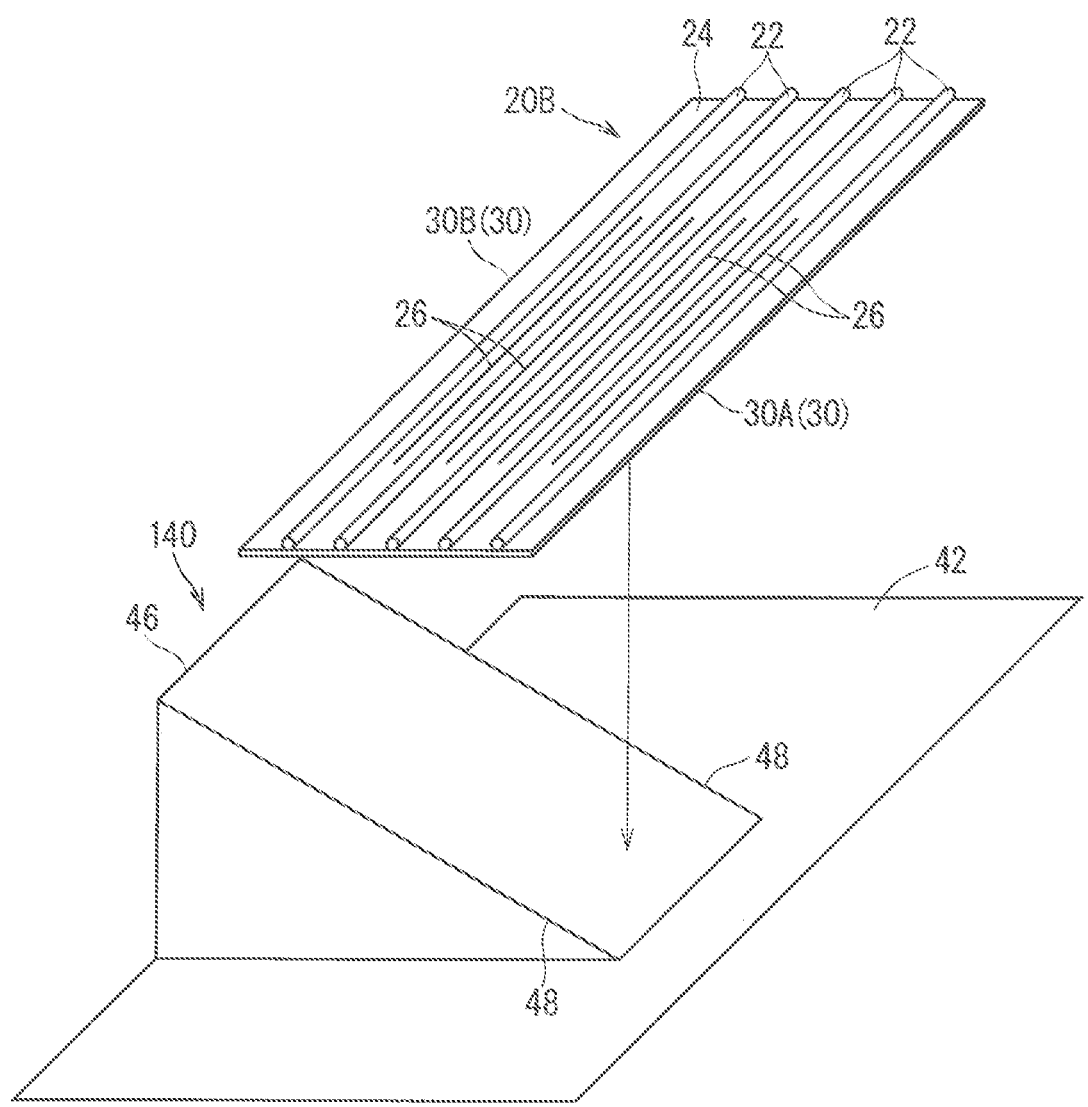
FIG. 4 is an explanation diagram illustrating the wiring member disposed on an arrangement target.

An arrangement structure of a wiring member according to an embodiment 2 is described. FIG. 3 is a perspective view illustrating an arrangement structure 110 of the wiring member according to the embodiment 2. FIG. 4 is an explanation diagram illustrating the wiring member 20B disposed on an arrangement target 140. In the following description of the present embodiment, the same reference numerals are assigned to the similar constituent elements described above, and the description thereof will be omitted.

In the arrangement structure 110 of the wiring member, a shape of the arrangement target 140 and a route of the wiring member 20 are different from the shape of the arrangement target 40 and the route of the wiring member 20 in the arrangement structure 10 of the wiring member. The arrangement target 140 is provided with an obstacle 46. The wiring member 20 extends over the obstacle 46. The route of the wiring member 20 is set so as not to go around the obstacle 46 but to extend over the obstacle 46. A level difference 48 occurs between the arrangement surface 42 and the obstacle 46. The wiring member 20 is bended in a portion where the wiring member 20 extends over the level difference 48. The wiring member 20 is bended in a direction away from the arrangement surface 42 in the portion where the wiring member 20 extends over the level difference 48.

The level difference 48 includes a portion having different heights along a parallel direction of the plurality of wire-like transmission members 22. In the example illustrated in FIG. 3, the obstacle 46 includes an inclined surface. The wiring member 20 is disposed to cross the inclined surface. A portion between the arrangement surface 42 and the inclined surface constitutes the level difference 48 having different heights.

The level difference 48 includes the portion having the different heights along the parallel direction of the plurality of wire-like transmission members 22, thus a difference may occur in lengths of routes of the plurality of divided portions 30 when the wiring member 20 extends ever the level difference 48. Even in this case, the slit 26 is formed in the sheet 24 herein, thus each of the plurality of divided portions 30 can be independently moved. Accordingly, the difference in lengths of the routes can be reduced or absorbed. Accordingly, a range in which the wiring member 20B can be bended increases. More specifically, for example, the difference in lengths of the comes can be reduced by bringing some of the divided portions 30 close to each other or making them overlap with each other in the portion where the wiring member 20 extends over the level difference 48. For example, the difference in lengths of the routes can be absorbed by bending some of the divided portions 30 in a direction away from the arrangement surface 42 in the portion where the wiring member 20 extends over the level difference 48.

Specifically, the length of the route of the divided portion 30A on a side with a lower height in the plurality of divided portions 30 is shorter than the length of the route of the divided portion 30B on a side with a higher height in the portion where the wiring member 20 extends over the level difference 48. In this case, the difference in length of the routes is reduced by bringing the divided portion 30A close to the divided portion 30B or bringing the divided portion 30B close to the divided portion 30A. The divided portion 30B is bended in a direction away from the arrangement surface 42 at a position farther away from the level difference 48 in relation to the divided portion 30A (a side of an end portion of the slit 26), thus the route is shortened, and the difference in lengths of the route is reduced. The difference in lengths of the routes can be absorbed by bending the divided portion 30A having a short length of the route in a direction away from the arrangement surface 42 so that the divided portion 30A makes a gap with the arrangement surface 42.

In the example illustrated in FIG. 3, the obstacle 46 having the level difference 48 is formed into a triangular prism-like shape, but may also be formed into a shape other than the triangular prism-like shape.

Modification Example

Figure 5:
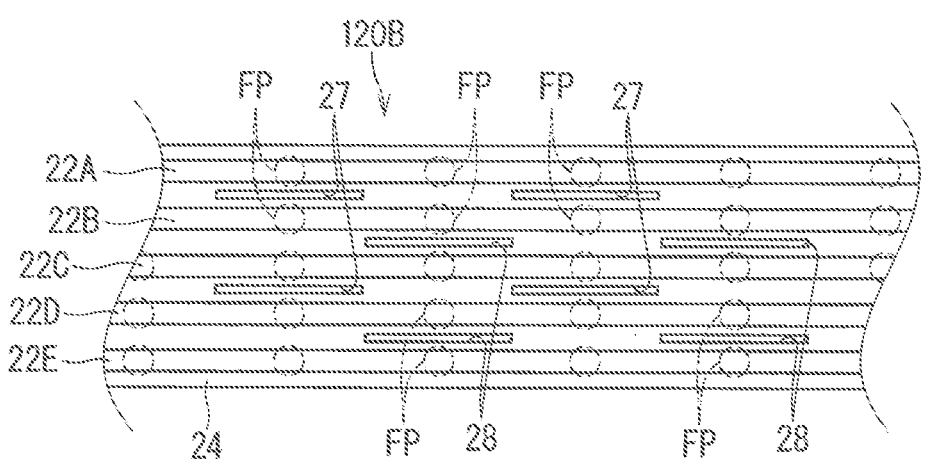
FIG. 5 is a plan view illustrating a modification example of the wiring member.

FIG. 5 is a plan view illustrating a modification example of the wiring member 20. In the example described above, the plurality of slits 26 are formed in the same region, however, this configuration is not necessary. Regions where the plurality of slits 26 are formed may be different from each other.

A first slit 27 and a second slit 28 are formed in the wiring member 120B illustrated in FIG. 5. The first slit 27 is formed between a first pair of the wire-like transmission members 22 in the plurality of wire-like transmission members 22. The second slit 28 is formed between a second pair of the wire-like transmission members 22 in the plurality of wire-like transmission members 22. In the example illustrated in FIG. 5, the first slit 27 is formed between wire-like transmission members 22A and 22B and between wire-like transmission members 22C and 22D in five wire-like transmission members 22A, 22B, 22C, 22D, and 22E. The second slit 28 is formed between the wire-like transmission members 22B and 22C and between the wire-like transmission members 22D and 22E in five wire-like transmission members 22A, 22B, 22C, 22D, and 22E.

The first slit 27 and the second slit 28 are formed in different positions along the longitudinal direction. The first slit 27 and the second slit 28 are formed in the different positions along the longitudinal direction in this manner, thus reduction in strength of the sheet 24 can be suppressed while the wiring member 120B is easily bended. Three or more types of slit may be formed in different positions along the longitudinal direction.

In the example illustrated in FIG. 5, one end of the first slit 27 and one end of the second slit 28 are located in the same position along the longitudinal direction of the wiring member 20. A region where the first slit 27 is formed and a region where the second slit 28 is formed may be located at intervals along the longitudinal direction of the wiring member 120B. That is to say, a portion where any of the first slit 27 and the second slit 28 is not formed may be located in a part of the wiring member 120B along the longitudinal direction. A region where the first slit 27 is formed and a region where the second slit 28 is formed may be partially overlapped with each other along the longitudinal direction of the wiring member 120B. That is to say, a portion where both the first slit 27 and the second slit 28 are formed may be located in a part of the wiring member 120B along the longitudinal direction.

In addition, in the example described above, the plurality of slits 26 are formed to have the same length, however, this configuration is not necessary. The lengths of the plurality of slits 26 may be different from each other. The slit 26 provided on a side in which the length of the route is short may be longer or shorter than the slit 26 provided on a side in which the length of the route is long, for example. Specifically, in the case of the example illustrated in FIG. 1, the slit 26 located on an inner peripheral side of the bended portions CP1 and CP2 is the slit 26 provided on a side in which the length of the route is short. The slit 26 located on an outer peripheral side of the bended portions CP1 and CP2 is the slit 26 provided on a side in which the length of the route is long. In the case of the example illustrated in FIG. 3, the slit 26 located on a side in which the height of the level difference 48 is low in a portion where the wiring member 20 extends over the level difference 48 is the slit 26 provide on a side in which the length of the route is short. The slit 26 located on a side in which the height of the level difference 48 is high in a portion where the wiring member 20 extends over the level difference 48 is the slit 26 provided on a side in which the length of the route is long.

In the above description, the plurality of wire-like transmission members 22 are fixed to the main surface of the sheet 24 in the wiring member 20, however, this configuration is not necessary. For example, the wiring member may be a flexible flat cable (FFC) or flexible print circuits (FPC).

In the above description, the sheet 24 and the wire-like transmission member 22 are fixed at a plurality of positions at intervals along the longitudinal direction of the wire-like transmission member 22, however, this configuration is not necessary. The sheet 24 and the wire-like transmission member 22 may be wholly fixed along the longitudinal direction of the wire-like transmission member 22. In the above description, the sheet 24 and the wire-like transmission member 22 are fixed in a lateral portion of the slit 26, however, this configuration is not necessary. The sheet 24 and the wire-like transmission member 22 may not be fixed in a lateral portion of the slit 26.

The base 24 may include a cover. The cover covers the wire-like transmission member 22 from a side opposite to the sheet 24. When the base 24 includes the cover, a slit is preferably formed in also the cover. The slit in the cover may be formed in the same position as or a different position from the slit 26 in the sheet 24. The cover may be wholly or partially overlapped with the sheet 24. The cover may be a resin sheet. For example, the cover may be formed by resin such as PVC, PE, PP, or PET in the manner similar to the sheet 24. One of the sheet 24 and the cover may be softer than the other one. The softness herein, or rigidity conversely, may also be evaluated by Rockwell hardness, for example. For example, it is applicable that the cover is formed by a material such as rigid PVC, nylon, PET, or PP, and the sheet 24 is a soft member made up of a sheet-like member firmed by soft PVC and a non-woven cloth formed by PET stacked with each other.

The wiring member made up of a plurality of stacked layers of wiring bodies, each of which is made up of the wire-like transmission member 22 and the sheet 24 fixed to each other. In this case, the slit 26 may be formed in the same position in the plurality of wiring bodies, or may also be formed in different positions.

The wiring members 20 and 120 are bended and disposed on the arrangement targets 40 and 140, however, this configuration is not necessary. It is also applicable that the wiring member 20B is not bended but is linearly disposed on the arrangement target. The wiring member 20 may also be applied to a bonded portion other than the portions described above. For example, the wiring member 20 may extend as it is after extending over the level difference 48. That is to say, the wiring member 20 may be disposed in a twisted form. The wiring member 20 may be applied to a portion where both a bending for changing the longitudinal direction such as the bended portion CP1 and the level difference 48 are located.

The configurations described in the embodiments and modification examples thereof can be appropriately combined as long as they are not contradictory.

EXPLANATION OF REFERENCE SIGNS

10, 110 arrangement structure of wiring member
20, 20B, 120, 120B wiring member
22 wire-like transmission member
24 sheet (base)
26 slit
27 first slit
28 second slit
30 divided portion
40, 140 arrangement target
42 arrangement surface
44, 45, 46 obstacle
48 level difference
WP fixing position

The invention claimed is:

1. A wiring member, comprising:
a plurality of wire-like transmission members parallelly arranged, each of the plurality of wire-like transmission members including a wire covered by a sheath; and
a sheet having a main surface to which the plurality of wire-like transmission members are fixed, wherein
a slit extending along a longitudinal direction of the plurality of wire-like transmission members is formed in a portion of the sheet between the plurality of wire-like transmission members, and
each of the plurality of wire-like transmission members is fixed to the sheet at a plurality of fixing positions at intervals along the longitudinal direction, and is not fixed to the sheet between each adjacent fixing positions of the plurality of fixing positions in the longitudinal direction.

2. An arrangement structure of a wiring member, comprising:
a wiring member including a plurality of wire-like transmission members parallelly arranged and a base keeping the plurality of wire-like transmission members in a state of being arranged side by side; and
an arrangement target of the wiring member, wherein
a slit extending along a longitudinal direction of the plurality of wire-like transmission members is formed in a portion of the base between the plurality of wire-like transmission members,
the base includes a sheet,
the plurality of wire-like transmission members are fixed to a main surface of the sheet,
the plurality of wire-like transmission members include a first wire-like transmission member and a second wire-like transmission member individually including a wire covered by a covering,
each of the first and second wire-like transmission members is fixed to the sheet at a plurality of fixing positions at intervals along the longitudinal direction, and is not fixed to the sheet between each adjacent fixing positions of the plurality of fixing positions in the longitudinal direction, a fixing position of the first wire-like transmission member and a fixing position of second wire-like transmission member are provided at an identical position along a longitudinal direction of the sheet, the covering of the first wire-like transmission member and the covering of the second wire-like transmission member are not fixed to each other, and the first wire-like transmission member and the second wire-like transmission member are disposed at an interval, and the slit is formed in a portion of the sheet between the fixing position of the first wire-like transmission member and the fixing position of the second wire-like transmission member that are provided at the identical position along the longitudinal direction of the sheet.

3. An arrangement structure of a wiring member, comprising:

a wiring member including a plurality of wire-like transmission members parallelly arranged, each of the plurality of wire-like transmission members including a wire covered by a sheath, and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members, the base includes a sheet, the plurality of wire-like transmission members are fixed to a main surface of the sheet, each of the plurality of wire-like transmission members is fixed to the sheet at a plurality of fixing positions at intervals along the longitudinal direction, and is not fixed to the sheet between each adjacent fixing positions of the plurality of fixing positions in the longitudinal direction, at least one fixing position of the plurality of fixing positions is provided in a lateral position of the slit, and both the at least one fixing position and a portion of the plurality of wire-like transmission members that is not fixed to the sheet are provided in the lateral position of the slit.

4. The arrangement structure of the wiring member according to claim 2, wherein a first slit is formed as the slit between a first pair of wire-like transmission members in the plurality of wire-like transmission members, a second slit is formed as the slit between a second pair of wire-like transmission members in the plurality of wire-like transmission members, and the first slit and the second slit are formed in different positions along the longitudinal direction.

5. An arrangement structure of a wiring member, comprising:

a wiring member including a plurality of wire-like transmission members parallelly arranged, each of the plurality of wire-like transmission members including a wire covered by a sheath, and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members, the base includes a sheet, each of the plurality of wire-like transmission members is fixed to the sheet at a plurality of fixing positions at intervals along the longitudinal direction, and is not fixed to the sheet between each adjacent fixing positions of the plurality of fixing positions in the longitudinal direction, the wiring member is disposed on the arrangement target while being bended at a position of the slit, and the wiring member includes a portion where each of the plurality of wire-like transmission members is not fixed to the sheet but is bended in a divided portion divided by the slit.

6. An arrangement structure of a wiring member, comprising:

a wiring member including a plurality of wire-like transmission members parallelly arranged, each of the plurality of wire-like transmission members including a wire covered by a sheath, and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members, the base includes a sheet, each of the plurality of wire-like transmission members is fixed to the sheet at a plurality of fixing positions at intervals along the longitudinal direction, and is not fixed to the sheet between each adjacent fixing positions of the plurality of fixing positions in the longitudinal direction, the wiring member is disposed on the arrangement target while being bended at a position of the slit, and centers of the wiring member in a width direction mutually deviate in the width direction in portions on both sides of a bended portion in the wiring member.

7. An arrangement structure of a wiring member, comprising:

a wiring member including a plurality of wire-like transmission members parallelly arranged, each of the plurality of wire-like transmission members including a wire covered by a sheath, and a base keeping the plurality of wire-like transmission members in a state of being arranged side by side; and an arrangement target of the wiring member, wherein a slit extending along a longitudinal direction of the plurality of wire-like transmission members is formed in a portion of the base between the plurality of wire-like transmission members, the base includes a sheet, each of the plurality of wire-like transmission members is fixed to the sheet at a plurality of fixing positions at intervals along the longitudinal direction, and is not fixed to the sheet between each adjacent fixing positions of the plurality of fixing positions in the longitudinal direction, the wiring member is disposed on the arrangement target while being bended at a position of the slit, the wiring member is bended at a portion where the wiring member extends over a level difference, the level difference includes a portion having different heights along a parallel direction of the plurality of wire-like transmission members, and the level difference is provided between a planar surface and an inclined surface crossing the planar surface.

* * * * *